L. L. GRIMWADE.
TEAPOT, COFFEE POT, AND OTHER INFUSING VESSEL.
APPLICATION FILED DEC. 14, 1909.

986,458.

Patented Mar. 14, 1911.

Witnesses

Inventor.

UNITED STATES PATENT OFFICE.

LEONARD LUMSDEN GRIMWADE, OF WOLSTANTON, ENGLAND.

TEAPOT, COFFEE-POT, AND OTHER INFUSING VESSEL.

986,458. Specification of Letters Patent. Patented Mar. 14, 1911.

Application filed December 14, 1909. Serial No. 532,984.

*To all whom it may concern:*

Be it known that I, LEONARD LUMSDEN GRIMWADE, subject of the King of Great Britain, residing at Wolstanton, in the county of Stafford, England, have invented certain new and useful Improvements Pertaining to Teapots, Coffee-Pots, and other Infusing Vessels, of which the following is a specification.

This invention consists of improvements in or pertaining to tea pots, coffee pots and other infusing vessels for the purpose of regulating the duration of infusion and relates more particularly to pots of that kind which contain a special perforated receptacle for the tea leaves or other substance, the water upon being poured into said receptacle until the same is filled rising to a higher level therein than in the other parts of the tea pot where it is at an abnormally low level, until both are restored to the same or normal level by releasing air which has been imprisoned meanwhile, and thus causing the water in the said receptacle to fall out of contact with the tea leaves, or other substance, which is being infused.

More particularly my invention consists of an appliance somewhat resembling a diving bell in its action, within which the air is imprisoned and compressed by the surrounding fluid, a suitable air valve being provided for release of said compressed air when required; this appliance is not made integral with the tea pot, but is separate therefrom and formed conveniently in one piece. Its advantages are numerous as it is adaptable for any shape of tea pot, stands on the bottom of the pot and cannot become choked, possesses a broad base and is therefore steady and it can be easily cleaned; the latter is very important as other devices for the purpose above mentioned do not permit of being so cleaned and speedily become choked up with dregs which contaminate the pot or produce an unpleasant odor.

As in the form illustrated in the accompanying drawings the appliance may be provided with means for keeping it steady.

Figure 1:
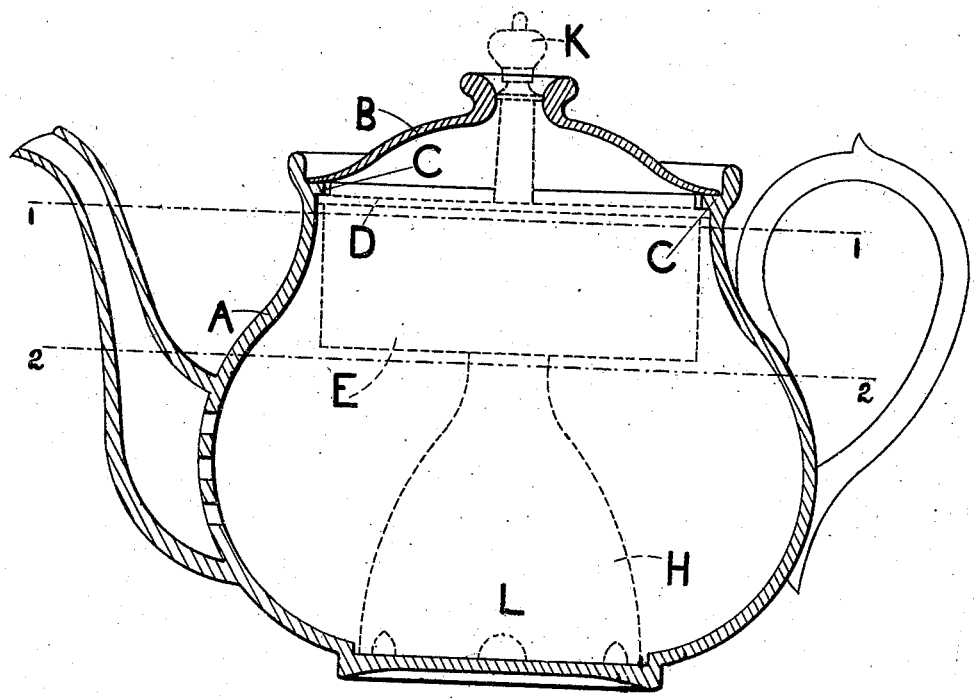
Figure 2:
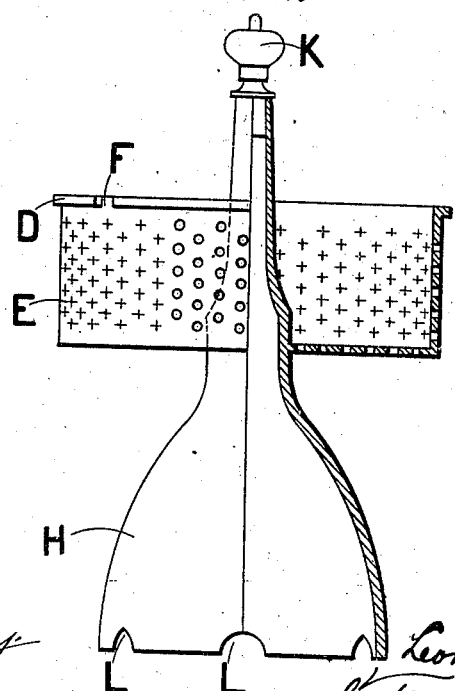

Referring to the said drawings Figure 1 is a section of a tea pot with my appliance shown therein by dotted lines, and Fig. 2 is a view, part in elevation, part in section of the appliance itself.

The tea pot A and lid B may be of one of the usual types, two or any other convenient number of nibs, for preference, being provided, in conjunction with corresponding gaps in the edge of the lid, to enable it to be introduced and retained in position by a slight turn. I also provide, by preference, a flange D on the strainer E that forms part of the appliance, hereinafter described, said flange D being recessed as at F to correspond with nibs C inside the neck of the tea pot, and thereby allow of the appliance being removed from or replaced within the tea pot A when required. After the latter operation, it is merely necessary to turn the appliance slightly, so as to bring the nibs under the flange, whereupon the appliance will be securely held down upon the base of the tea pot. With the strainer E, and forming one with it, there is provided a bell H, the stem of which is hollow and passes up through the strainer and is capped with a suitable air valve K, which projects up through a hole in the lid B of the pot, so as to be easily accessible to the fingers. The bell is perforated at suitable points around its base, as at L, and its base is so shaped that it approximately fits within the sunken recess in the base of the tea pot, although this is immaterial.

The action of the apparatus is as follows: When it is secured within the tea pot, its air valve K being closed, water is poured into the tea pot through the strainer E in the usual manner, and partially enters the bell H, through the perforations L, but does not rise so high therein as in the surrounding part of the tea pot owing to a certain amount of air becoming imprisoned and unable to escape, the water being continued to be poured in, however, reaches at length the level 1—1 (see Fig. 1) in the space outside of the bell and thus fills the strainer E in which are the tea leaves. After sufficient length of time for the tea to be infused, the imprisoned air is released from the bell H by opening the air valve K, and the water consequently rises therein, a corresponding lowering taking place in the other parts of the pot, until a general level 2—2 (Fig. 1) is reached, which is below the strainer E. Excessive infusion of the tea is thus prevented.

The relative positions of the nibs and gaps in the respective parts aforesaid may obviously be interchanged to suit any special requirement.

I claim—

1. In a device of the character described, the combination with a vessel, of a strainer for holding the substance to be infused, a bell supporting the strainer, said bell extending below the strainer adapted to retain air, and means for permitting the air in the bell to escape whereby the water poured over the substance rises in said bell and falls below the strainer.

2. In a device of the class described, the combination with a vessel, of a perforated receptacle for holding the substance to be infused, a bell supporting the strainer, said bell extending below the receptacle adapted to retain air, a hollow stem connected to the bell and passing through said receptacle, and means for permitting the air to escape through the stem whereby the water poured over the substance rises in said bell and falls below said receptacle.

3. In a device of the class described, the combination with a vessel, of a perforated receptacle for holding the substance to be infused, a bell supporting the strainer, said bell extending below the receptacle adapted to retain air, the bell resting on the bottom of said vessel and having recesses in its edge, a hollow stem connected to the bell and passing through said receptacle, and a valve for permitting the air to escape through the stem whereby the water poured over the substance passes through said recesses, rises in the bell and falls below said receptacle.

Dated November 25th 1909.

In testimony whereof, I affix my signature in the presence of two witnesses.

LEONARD LUMSDEN GRIMWADE.

Witnesses:
J. PRESTON HOUGHTON,
JOHN H. COPESTAKE.

---

Copies of this patent may be obtained for five cents each, by addressing the "Commissioner of Patents, Washington, D. C."